United States Patent
Arakawa et al.

(10) Patent No.: US 7,537,096 B2
(45) Date of Patent: May 26, 2009

(54) MOTOR DRIVEN BRAKE APPARATUS FOR A VEHICLE

(75) Inventors: Haruo Arakawa, Toyota (JP); Takahisa Yokoyama, Anjo (JP); Takayuki Takeshita, Anjo (JP); Chihiro Nitta, Anjo (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 561 days.

(21) Appl. No.: 11/290,521

(22) Filed: Dec. 1, 2005

(65) Prior Publication Data

US 2006/0118368 A1 Jun. 8, 2006

(30) Foreign Application Priority Data

Dec. 7, 2004 (JP) ............................. 2004-354040

(51) Int. Cl.
 *F16D 55/08* (2006.01)
(52) U.S. Cl. ............... 188/72.1; 188/73.1; 188/156; 188/158
(58) Field of Classification Search ............... 188/72.1, 188/73.1, 156, 157, 158, 159, 160
See application file for complete search history.

(56) References Cited

U.S. PATENT DOCUMENTS 5,107,967 A * 4/1992 Fujita et al. ................. 188/72.1
5,388,669 A * 2/1995 Holl et al. ................... 188/71.2
6,923,295 B2 * 8/2005 Halasy-Wimmer et al. . 188/71.2

FOREIGN PATENT DOCUMENTS

JP 04108058 A * 4/1992
JP 2003-287069 10/2003

* cited by examiner

*Primary Examiner*—Pam Rodriguez
(74) *Attorney, Agent, or Firm*—Buchanan Ingersoll & Rooney PC

(57) ABSTRACT

A motor driven brake apparatus is provided for braking a wheel mounted on a knuckle, and includes a brake member rotated integrally with the wheel, a friction member mounted on the knuckle to be capable of being in contact with the brake member, and an electric motor for driving the friction member toward the brake member to be in contact therewith. The motor is adapted to press the friction member onto the brake member to restrain the wheel from rotating. And, a motion converter is accommodated in an opening portion of the knuckle for converting rotating force of the motor into pressing force applied by the friction member onto the brake member. The motion converter is connected to the motor at a side thereof facing the vehicle body, and the motor is mounted on the knuckle.

6 Claims, 1 Drawing Sheet

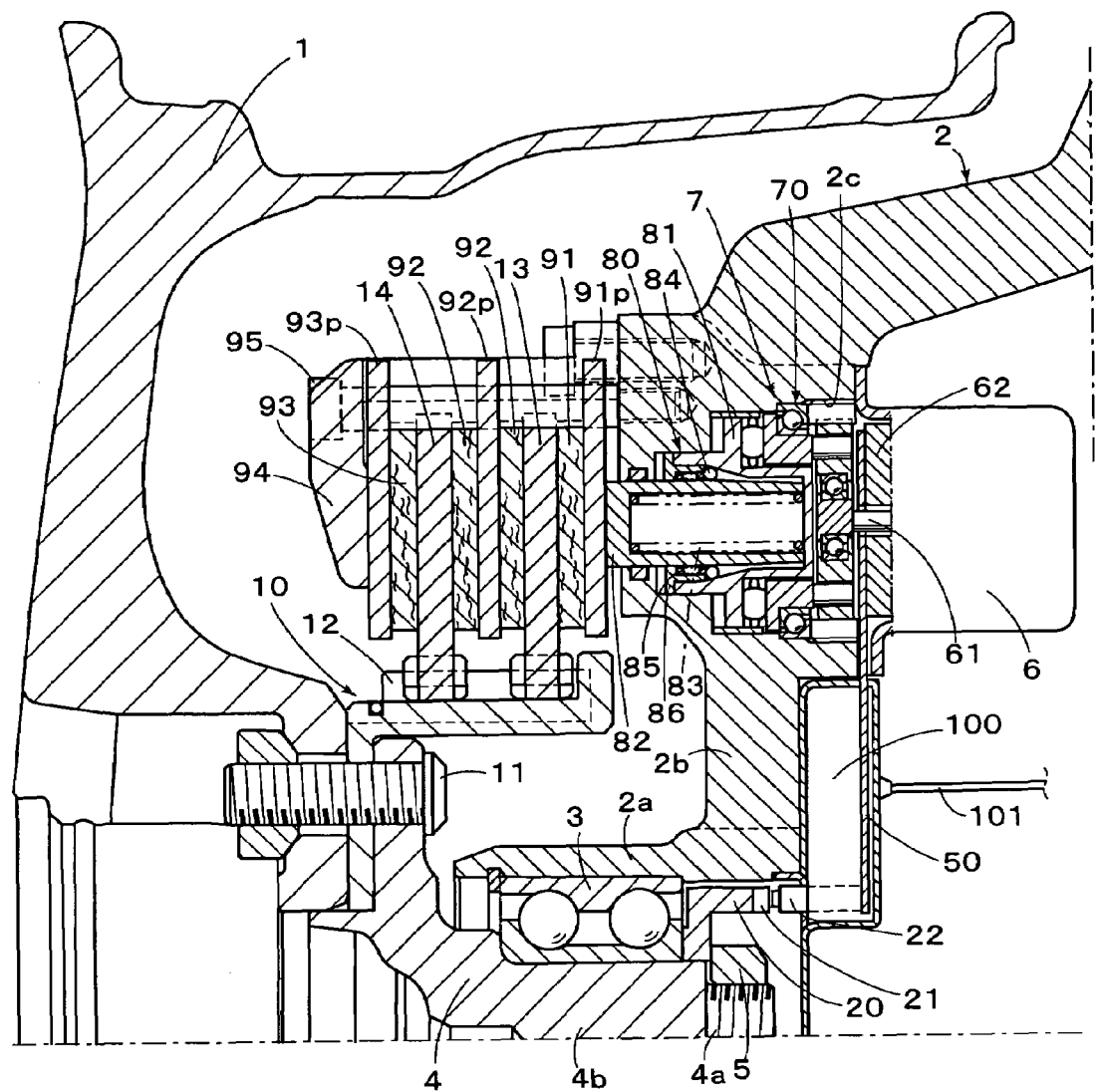

MOTOR DRIVEN BRAKE APPARATUS FOR A VEHICLE

This application claims priority under 35 U.S.C. Sec.119 to No.2004-354040 filed in Japan on Dec. 7, 2004, the entire content of which is herein incorporated by reference.

BACKGROUND OF THE INVENTION

1. Field of the Invention

The present invention relates to a motor driven brake apparatus for a vehicle, particularly relates to an apparatus for pressing a friction member onto a brake member by means of an electric motor to restrain a vehicle wheel from rotating.

2. Description of the Related Arts

As for a motor driven brake apparatus for a vehicle, it has been proposed that a friction member is pressed onto a brake member by means of an electric motor to restrain a wheel from rotating. In Japanese Patent Laid-open Publication No.2003-287069, for example, there is disclosed a motor driven brake apparatus which converts a rotation of an electric motor into a thrust motion for driving a piston, to press a friction pad onto a disc rotor, thereby to produce braking force. In the above Publication, it has been proposed that a controller for controlling the electric motor is integrally installed in a disc brake device, and that a wire harness for a wheel speed sensor is connected to the controller.

According to the apparatus as described in the Publication, it is not required to arrange the wire harness for the wheel speed sensor from downward of a suspension to upward thereof. However, the wire harness for connecting the wheel speed sensor with the controller is still required, and it is necessary to assemble them. The brake apparatus is assembled with the electric motor and a speed reducing mechanism or else, so that it becomes large and heavy. At the same time, as the controller is integrally installed in the disc brake device, capacity of the disc brake device becomes larger. Therefore, it is very difficult to install the apparatus on a conventional vehicle. Furthermore, as the controller is likely affected by heat created by the electric motor or the like, it is required to apply some countermeasures against the heat.

SUMMARY OF THE INVENTION

Accordingly, it is an object of the present invention to provide a motor driven brake apparatus for pressing a friction member onto a brake member by means of an electric motor to restrain a vehicle wheel from rotating, to be capable of wiring the electric motor easily and certainly, with a simple structure, and high reliability.

In accomplishing the above object, the motor driven brake apparatus is provided for braking a wheel mounted on a knuckle having an axial portion for rotatably supporting the wheel, and a body portion integrally formed with the axial portion and mounted on a vehicle body, with an opening portion formed on the body portion to be opened toward the vehicle body. The brake apparatus includes a brake member rotated integrally with the wheel, a friction member mounted on the knuckle to be capable of being in contact with the brake member, and an electric motor for driving the friction member toward the brake member to be in contact therewith. The electric motor is adapted to press the friction member onto the brake member to restrain the wheel from rotating. And, a motion converter is accommodated in the opening portion of the knuckle for converting rotating force of the electric motor into pressing force applied by the friction member onto the brake member. The electric motor is mounted on the knuckle, and the motion converter is connected to the electric motor at a side of the knuckle facing the vehicle body.

The motor driven brake apparatuses as described above may further include a circuit board that is disposed between the motion converter and the electric motor, and the electric motor may be electrically connected directly to the circuit board.

The motor driven brake apparatus may further include a sensor rotor mounted on a rotation axis of the wheel to be rotated integrally with the wheel, and a wheel speed sensor for detecting a wheel speed of the wheel. Preferably, the circuit board has an end portion thereof placed in the vicinity of the rotation axis of the wheel, and the wheel speed sensor may be mounted on the end portion of the circuit board to face the sensor rotor.

And, the motor driven brake apparatus may further include a controller mounted on the knuckle for controlling the electric motor, and preferably the controller is electrically connected to the electric motor through the circuit board.

BRIEF DESCRIPTION OF THE DRAWING

The above stated object and following description will become readily apparent with reference to the accompanying drawing, which is a cross sectional view of a part of a motor driven brake apparatus for a vehicle, according to an embodiment of the present invention.

DESCRIPTION OF THE PREFERRED EMBODIMENT

Referring to the drawing, there is illustrated a motor driven brake apparatus according to an embodiment of the present invention, which particularly relates to a disc brake apparatus disposed in a vehicle wheel 1. A vehicle suspension includes a knuckle 2 having a cylindrical axial portion 2a for rotatably supporting the wheel 1, and includes a body portion 2b that is integrally formed with the axial portion 2a. The body portion 2b is formed with an opening portion 2c in approximately parallel with a rotation axis of the wheel 1, to be opened at least toward the vehicle body (rightward in the drawing). According to the present embodiment, the body portion 2b is opened leftward in the drawing, as well, thereby to provide a through hole.

In the axial portion 2a of the knuckle 2, a hub 4 is rotatably supported through a bearing 3. The hub 4 is secured to the wheel 1 by bolt-and-nut 11, with a disc rotor 10 being clamped between them and disposed in a space defined between the wheel 1 and the knuckle 2. The disc rotor 10 is served as a brake member according to the present invention, and formed with a cylindrical portion, on the outer circumferential surface of which a slide pin 12 is secured in parallel with the rotation axis of the wheel 1. A couple of annular members 13 and 14 are slidably mounted on the slide pin 12, in parallel with the rotation axis of the wheel 1. Accordingly, the hub 4, disc rotor 10 and wheel 1 are integrally rotated relatively to the knuckle 2, and therefore relatively to the vehicle body, at a rotational speed in response to the vehicle speed.

The hub 4 is formed with a cylindrical body portion 4b and an end portion 4a, on the outer circumferential surface of which thread grooves are formed. A bearing 3 is fitted into an inner hole of the axial portion 2a of the knuckle 2, and the body portion 4b of the hub 4 is fitted into the inside of the bearing 3, such that the end portion 4a of the hub 4 extends from the bearing 3. Then, after an annular sensor rotor 20 is mounted on the end portion 4a of the hub 4, a nut 5 is engaged with the thread grooves of the end portion 4a. The sensor rotor 20 constitutes a wheel speed detection device together with a wheel speed sensor 22 as described later, and has an end surface formed with a teeth portion 21.

In the opening portion 2c of the knuckle 2, accommodated is a motion converter 7 for converting rotating force of an electric motor 6 into pressing force applied by a friction member (91 and etc.) to a brake member (disc rotor 10). The motion converter 7 is connected to the electric motor 6 at the vehicle side relative to the knuckle 2, on which the electric motor 6 is mounted. Between the electric motor 6 and the motion converter 7, there is disposed a circuit board 50, to which a stator 62 of the electric motor 6 is secured, and electrically connected, directly. The circuit board 50 extends to the end portion 4a of the hub 4, in the vicinity of the rotation axis of the wheel. The wheel speed sensor 22 is mounted on the extended portion of the circuit board 50 to face the teeth portion 21 of the sensor rotor 20, and electrically connected to the circuit board 50. Between the circuit board 50 and the body portion 2b of the knuckle 2, disposed at the vehicle side with respect to the knuckle 2 is a controller 100 which is adapted to control the electric motor 6, and which is electrically connected to the wheel speed sensor 22 and the electric motor 6 through the circuit board 50. And, a lead wire 101 is connected to the controller 100.

The electric motor 6 has an output axis 61 that is connected to the motion converter 7, such that its rotating motion is converted into the thrust (straight) motion of a piston member 80, and then into the pressing force applied by the friction member (91 and etc.) to the brake member (disc rotor 10). The motion converter 7 includes the piston member 80 and a speed reducing mechanism 70, various types of which are known heretofore, and which may be of a conventional type in the present embodiment, so that structural explanation of the speed reducing mechanism 70 is omitted herein. The piston member 80 includes a cylinder with a bottom 81 (hereinafter, simply referred to as a cylinder 81) and a cylinder with a bottom 82 (hereinafter, simply referred to as a cylinder 82) associated with each other, such that their opening portions are overlapped with each other. A compression spring 83 is disposed between the cylinders 81 and 82, so as to urge them to be away from each other. The cylinder 81 is formed with a tapered inner surface to be gradually enlarged in diameter toward its open end. Between the tapered inner surface of the cylinder 81 and the outer circumferential surface of the cylinder 82, balls 84 and a compression spring 85 are disposed, and a stopper 86 is fixed to the open end of the cylinder 81. Consequently, the cylinders 81 and 82 can be integrally advanced, leftward in the drawing, and the cylinder 82 can be advanced relatively to the cylinder 81.

Consequently, the rotational output of the electric motor 6 is reduced by the speed reducing mechanism 70, and converted into the thrust motion of the piston member 80, so that a first friction member 91 is pressed outward (toward the wheel 1), in parallel with the rotation axis of the wheel 1. According to the present embodiment, the friction member includes the first friction member 91, second friction members 92 and third friction member 93, which are secured to a first back plate 91p, second back plate 92p and third back plate 93p, respectively, and slidably supported on support pins 95, which penetrate the back plates 91p, 92p and 93p, and which secure an arm member 94 to the knuckle 2. Therefore, thrust force applied to the first friction member 91 is transmitted to the annular member 13, second friction members 92, annular member 14, third friction member 93 and arm member 94, in sequence. As the annular members 13 and 14 are slidably supported on the disc rotor 10, in parallel with the rotation axis of the wheel, to provide a so-called floating system, they are pressed evenly by the friction members 91, 92 and 93. With the friction members 91, 92 and 93 being worn, each clearance between each of them and the annular members 13 and 14 will be enlarged. According to the present embodiment, however, the piston member 80 has been constituted such that the cylinder 82 is advanced relatively to the cylinder 81, with the friction members being worn to be thinner. Therefore, those members can be held to be in tight contact with each other.

Next will be explained operation of the motor driven brake apparatus as constituted above. When the sensor rotor 20 is rotated in response to rotation of the wheel 1, the wheel speed sensor 22 generates an electric signal in proportion to a rotational speed of the wheel 1, which signal is fed into the controller 100. On the basis of that signal together with signals fed from the lead wire 101, a control factor for the electric motor 6 is calculated, so that the electric motor 6 is actuated by a control signal output from the controller 100 in response to the control factor. Then, the rotating motion of the electric motor 6 is reduced by the speed reducing mechanism 70, and converted into the thrust motion of the piston member 80, to press the first, second and third friction members 91, 92 and 93, whereby the braking force is applied to the disc rotor 10.

According to the motor driven brake apparatus as constituted above, therefore, the housing corresponding to the cylinder of the prior apparatus can be constituted together with the knuckle 2 that has no relationship with the brake system, originally. Therefore, a sufficient strength can be obtained, with its weight and capacity being largely reduced. Furthermore, with respect to its installation accuracy, an error in inclination caused between the prior knuckle and the mounting and cylinder can be cancelled according to the present embodiment, so that depression of the motion converter 7 can be restrained. However, with respect to the electric motor 6 that is not applied with such a specific load in operation that requires a high accuracy to overcome the load, it is useless to accommodate the electric motor 6 in the knuckle 2. Rather, the thickness and width of the knuckle 2 shall be forced to be unnecessarily large, thereby to cause its weight and capacity to be increased. Therefore, it is preferable to arrange the electric motor 6 outside of the knuckle 2 as shown in the drawing.

As the controller 100 requires a lot of wire harnesses for supplying electric power to the electric motor 6 and communicating with it through control signals, the installation space will be extremely increased by simply forming the controller 100 integrally with the electric motor 6 or disc brake device, while it is proposed in the aforementioned prior Publication that the controller and motor are formed integrally, so that the wire harness is removed. In view of the specific structure of the electric motor, the controller is to be mounted on an end portion of the motor placed inside of the vehicle, as illustrated in the prior Publication, whereby a longitudinal length of the disc brake device will be so large that it will be extremely difficult to mount it on the vehicle. In contrast, according to the present embodiment as constituted above, the motor driven brake apparatus can be made without substantially enlarging the longitudinal length of the disc brake device, and the controller 100 can be disposed at such a position that there is a room for the installation space, with the wire harness being removed. Particularly, the controller 100 can be disposed at such a position that there is a little possibility to be affected by the heat generated by the electric motor 6 and the disc brake device. Even the wire harness connected to the wheel speed sensor 22 can be removed, to improve the reliability of its installation on the vehicle.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A motor driven brake apparatus for braking a wheel mounted on a knuckle having an axial portion for rotatably supporting said wheel, and a body portion integrally formed with said axial portion and mounted on a vehicle body, with an opening portion formed on said body portion to be opened toward said vehicle body, comprising:
   a brake member rotated integrally with said wheel;
   a friction member mounted on said knuckle to be capable of being in contact with said brake member;
   an electric motor for driving said friction member toward said brake member to be in contact therewith, said electric motor pressing said friction member onto said brake member to restrain said wheel from rotating;
   a motion converter accommodated in the opening portion of said knuckle for converting rotating force of said electric motor into pressing force applied by said friction member onto said brake member, said electric motor being mounted on said knuckle, and said motion converter being connected to said electric motor at a side of said knuckle facing said vehicle body; and
   a circuit board disposed between said motion converter and said electric motor, said electric motor being electrically connected directly to said circuit board.

2. The motor driven brake apparatus according to claim 1, further comprising a controller mounted on said knuckle for controlling said electric motor, said controller being electrically connected to said electric motor through said circuit board.

3. The motor driven brake apparatus according to claim 1, further comprising a sensor rotor mounted on a rotation axis of said wheel to be rotated integrally with said wheel, and a wheel speed sensor for detecting a wheel speed of said wheel, said circuit board having an end portion thereof placed in the vicinity of the rotation axis of said wheel, and said wheel speed sensor being mounted on the end portion of said circuit board to face said sensor rotor.

4. The motor driven brake apparatus according to claim 3, further comprising a controller mounted on said knuckle for controlling said electric motor, said controller being electrically connected to said electric motor through said circuit board.

5. The motor driven brake apparatus according to claim 4, wherein said controller is disposed between said knuckle and said circuit board.

6. The motor driven brake apparatus according to claim 5, wherein said sensor rotor has an end surface formed with teeth to face said wheel speed sensor.

\* \* \* \* \*